United States Patent [19]
Tung et al.

[11] Patent Number: 5,903,321
[45] Date of Patent: May 11, 1999

[54] METHOD AND APPARATUS FOR VIDEO IMAGE PROCESSING AND RECORDING

[75] Inventors: Pei-Hui Tung, Bade; Chen-Pang Kung, Tainan; Dar-Chang Juang, Chia-I, all of Taiwan

[73] Assignee: Industrial Technology Research Institute, Hsinchu, Taiwan

[21] Appl. No.: 08/718,995

[22] Filed: Sep. 24, 1996

[51] Int. Cl.$^6$ .............................. H04N 5/225; H04N 5/76; H04N 9/64

[52] U.S. Cl. .......................... 348/715; 348/220; 348/231; 386/33; 386/34

[58] Field of Search ............................ 348/220, 231–233, 348/715, 716, 718; 386/33, 34, 38, 69, 70, 117, 124, 52; H04N 5/225, 5/76, 9/64

[56] References Cited

U.S. PATENT DOCUMENTS

| | | | |
|---|---|---|---|
| 5,042,078 | 8/1991 | Oshikoshi et al. | 348/564 |
| 5,446,599 | 8/1995 | Lemelson | 360/35.1 |
| 5,500,683 | 3/1996 | Yatomi et al. | 348/563 |
| 5,583,863 | 12/1996 | Hackett et al. | 348/716 |
| 5,621,429 | 4/1997 | Yamaashi et al. | 345/119 |
| 5,635,984 | 6/1997 | Lee | 348/564 |
| 5,742,329 | 4/1998 | Masunaga et al. | 348/564 |

*Primary Examiner*—Nathan Flynn
*Assistant Examiner*—Vivek Srivastava
*Attorney, Agent, or Firm*—Tung & Associates

[57] ABSTRACT

A video image signal processing and recording system provides for operation in a first mode in which real time display of video is provided and in a second mode in which the video image signals are digitized and stored in a memory and being read out and displayed in response to selection of a display mode for the system. In an enhanced mode operation for the system, increasing of the low light intensity value of the displayed real time images or displayed memory images to compensate for low light conditions or for the effects of back lighting. The video image signal processing and recording system is described with reference to an application in a door entry system for a residential building.

9 Claims, 2 Drawing Sheets

METHOD AND APPARATUS FOR VIDEO IMAGE PROCESSING AND RECORDING

FIELD OF THE INVENTION

This invention relates to video image signal processing and recording, and more particularly, to a method and apparatus for processing video image signals in video entry systems used in residential applications, or in video surveillance systems such as those that are used ATM machines at banking institutions and the like.

BACKGROUND OF THE INVENTION

In entry or door access systems or surveillance systems that employ television monitoring, typically a television camera is mounted on an outer wall at or near an entrance of a building or residence. The field of view of the television camera is determined as a function as application. Some surveillance systems provide a wider field of view because only movement of an intruder is to be detected. However, in video entry systems for residential applications or video surveillance of ATM machines associated with ATM machines must allow identification of a person seeking entrance to the residence, or a person using the ATM, requiring a small field of view.

Typical entry or door access systems that are direct viewing systems show the occupant a "live" picture of the field of view of the camera. Such systems do not provide for saving a video image either as it is being produced or for storing to provide a history of images.

Some systems, particularly those used at ATM locations, include a video recorder. However, these devices have limited storage capacity and video tapes must be changed.

Another problem associated with known video monitoring systems is insufficient illumination and blind spots due to a back-lit condition where the image cannot be recognized.

Moreover, such video monitoring systems are generally inflexible. For example, systems that are currently operate on only one type of video broadcast system standard, such as NSTC or PAL.

SUMMARY OF THE INVENTION

The present invention provides a digital video image signal processing and storage system which is an intelligent all-directional product. It not only serves the traditional function of a surveillance camera, it can also directly store and retrieve video image data (from a certain image) and then separate the output image and produce a electronically enlarged partial video image output.

The video storage apparatus provided by the present invention provides solutions to the problems of a conventional surveillance camera, such as insufficient illumination and blind spots due to a back-lit condition where image cannot be recognized. Moreover, the components are readily obtainable from commercial sources.

In accordance with one aspect of the invention, there is provided a video image signal processing and recording system which comprises a video camera for providing analog video image signals and input means including analog to digital converting means for converting the analog video image signals into digital video image signals. A memory storage means is provided for storing the digital video signals. A signal processing means processes the digital video image signals and stores the digital video image signals in the memory means. The system further includes means for causing the signal processing means to read the digital video image signals out of the memory means and output means including digital to analog signal converting means for converting the digital video image signals read out of the memory means into analog video image signals for application to a video monitor.

Further in accordance with the invention, there is provided a method for processing and recording analog video image signals produced by a video camera, The method comprising the steps of converting the analog video image signals into digital video image signals; storing the digital video image signals in a memory; reading the digital video image signals out of the memory; and converting the digital video image signals to analog video signals for application to a video monitor for providing a video display.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE PREFERRED EMBODIMENTS

Figure 1:
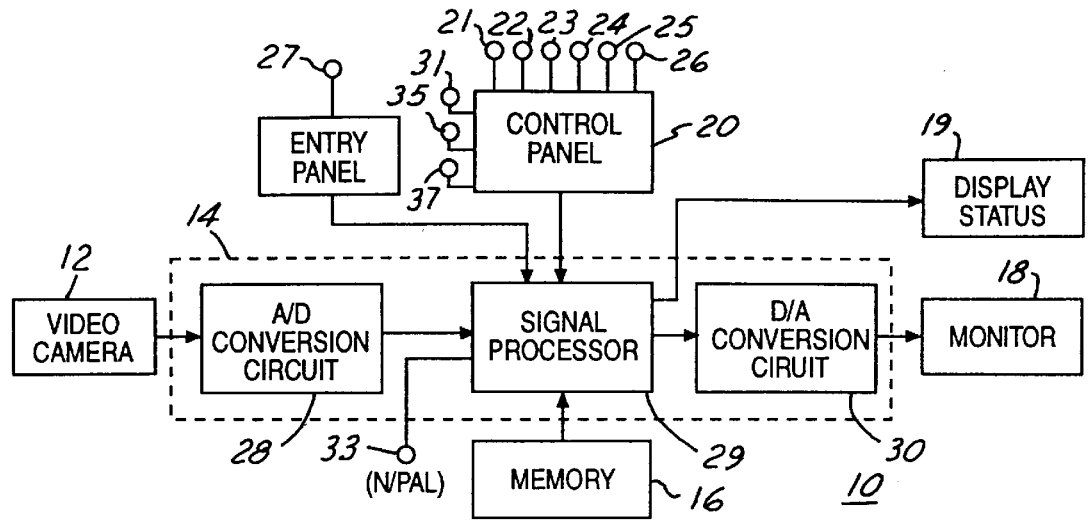
FIG. 1 is a block diagram of a video signal and recording system provided by the invention.

Referring to the drawings, FIG. 1 is a block diagram of a video signal processing and recording system 10 provided by the invention. The system 10 is described with reference to an application in a door entry or intercom system for providing security for residents or occupants of a building. However, the system 10 can be used in other applications, such as, in a camera surveillance system, as a surveillance system for automatic teller machines at banking institutions, etc.

The system 10 includes a video camera 12, a signal processing circuit 14, a memory 16, a video monitor 18 and a status display unit 19. The signal processing circuit 14 includes an analog to digital conversion circuit 28, a digital signal processor 29, and a digital to analog conversion circuit 30. The camera is a conventional black and white cameral having a CCD sensor array for imaging. As will be shown, the system provides for real time display of video and/or storage in the memory 16 of digitized video image data for subsequent read out and display on the video monitor 18.

The system 10 is operable in several operating modes which are selected by a plurality of switches 21–26 which are mounted on a master control panel 20 which is located within the protected premises and by a switch 27 which is mounted on an entry control panel 20a which is located at an entrance to the protected premises.

The switches 21–27 include a camera switch 21, a save switch 22, a display switch 23, a clear switch 24, an exit switch 25 and an enhancement mode select switch 26 and a visitor switch 27. Operation of the camera switch 21 causes the view within the field of view of the camera, scene to be displayed as in a typical surveillance system, that is, i.e., without storage of video image data for subsequent display. When the system is operating in the camera mode, the video image signals generated by the video camera are passed directly to the video monitor for display without storage.

The visitor switch 27 is intended to be operated by a visitor to start the process of storing and displaying a video image of the visitor. The first operation of the visitor switch 27 triggers image capture, causing video image data currently being generated to be stored in the memory 16. Any further operations of the switch are ignored for a period of at least about 100 seconds.

Operation of the save switch 22 causes a memory write cycle to be initiated for storing in the memory 16 the video image data that is currently being generated by the video camera. The save switch 22 is effective only when the system 10 is operating in the power-up or wake mode. The display switch 23 is a pulse switch the operation of which causes sequential display of all of the video images represented by video image data that is stored in the memory 16.

The clear switch 24 is a pulse switch, the operation of which causes all of the video image data stored in the memory 16 to be cleared from the memory. The clear switch 24 is effective only when the switch 24 is maintained depressed for more than three seconds. This is a safeguard for preventing unintentional or accidental erasure of video image data stored in the memory 16. Operation of the exit switch 25 causes the system 10 to be transferred to a power-down or sleep mode.

The enhanced mode select switch 26 is a pulse switch, the operation of which causes increasing of the low light intensity value of the displayed real time images or displayed memory images. The enhanced mode select switch 26 effectively selects the quality of the picture to be displayed.

The system 10 additionally includes a power-on switch 31 for energizing circuits of the system. The power-on switch 31 is a level switch that determines whether to start selection of the image storage function.

Analog video image signals produced by the video camera 12 are converted to digital signals by the analog to digital conversion circuit 14 of the signal processing circuit 14 and are processed by the digital signal processor for display and/or for storage in the memory 16. The digital video image signals processed by the digital signal processor 29 are converted back to analog video image signals by the digital to analog conversion circuit 30 for application to the video monitor to cause a display of the image captured by the video camera.

The system 10 provides four levels of digital gain adjustment for back light functions which can be used to remedy situations where either there is insufficient illumination of the area within the field of view of the video camera or blind spots are provided due to intense back light conditions within range of the video camera.

The system 10 can be selected to accept either an EIA of CCIR image signal and thus increase the compatibility of the system. To this end, a select switch N/PAL 33 provides an input to the controller.

Time and date information indicating the time of occurrence of an event or a video image can be merged with the video image signals for that video image so that the time and date information can be superimposed on a picture that is displayed on the video monitor. The time and date information is selected for inclusion with the video image date by operating time set switches which include a Time set-1 switch 35 and a Time set-2 switch 37. These switches are pulse switches, the operation of which causes the CPU 36 (FIG. 2) to generate digital time and date data for controlling a character generator 44 to generate suitable time signals. These switches are operational only when a real time image is being displayed. The time set-1 switch 35 must be held depressed for at least three seconds to enter into a time set mode. The time switches operate in the conventional manner, such as for setting a watch.

Figure 2:
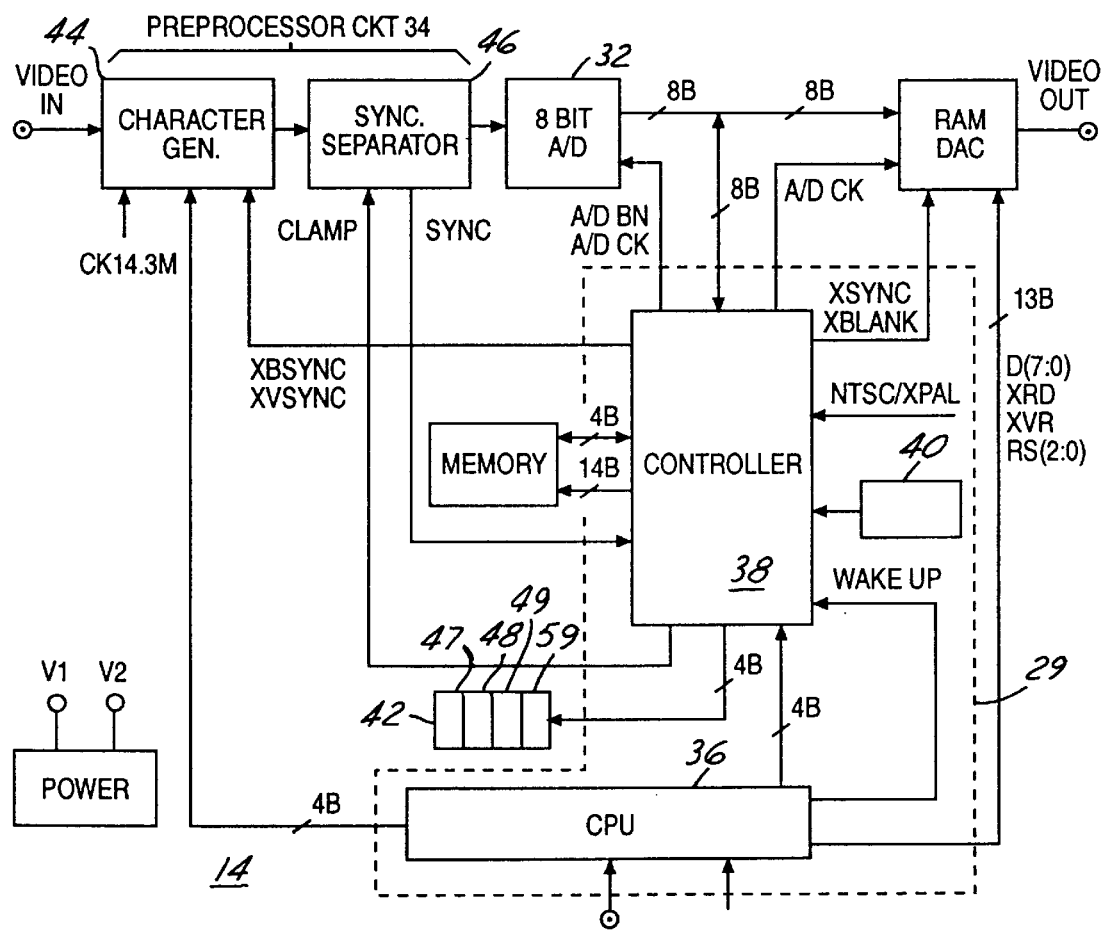
FIG. 2 is a block diagram of the signal processing circuit of the video signal and recording system of FIG. 1.

Considering the system 10 in more detail, with reference to the block diagram of the signal processing circuit 14 illustrated in FIG. 2, the analog to digital conversion circuit 28 includes an analog to digital converter 32 and a video signal preprocessing circuit 34. The digital signal processor 29 includes a central processing unit or CPU 36, a controller 38, and a source of clock pulses 40. The status display 19 is embodied as an LED display unit 42.

The video signal preprocessing circuit 34 includes character generator 44 and a synchronizing signal separator 46. The character generator 44 responds from control signals provided by the CPU to generate character data which is introduced into the analog video signals being supplied to the system 10. The character generator 44 is driven by a synchronizing signal at 14.3 MHz to be compatible with the analog video image signals being supplied to the system 10.

The synchronizing signal separator 46 includes a video amplifier section for amplifying the analog video image signals prior to application of the analog signals to the analog to digital converter. The synchronizing signal separator separates the composite synchronizing signal from the video image signal. In addition, the synchronizing signal separator 46 changes the DC voltage level of the analog video image signals to a reference level for the analog to digital converter 32. The composite synchronizing signal is supplied to the clock system of the controller 38. The composite synchronizing signal is supplied to the decoder at the output so that the system can operate under both the EIA and the CCIR standards.

The analog to digital converter 32 converts the analog video image signals to digital video image signals at a sampling rate of 10 Mhz. The analog to digital converter produces 256 bytes for each of the 256 lines for each frame of the video picture.

The controller 38 is embodied as a fixed programmable gate array. The controller 38 responds to control signals provided by the CPU 36 to generate write, read and refresh command signals for the memory 16. The controller 38 controls a four bit data bus D1–D4 and a fourteen bit address/memory control bus for the memory 16.

The memory 16 is a 4-bit, 4 MEG, dynamic random-access memory, which is commonly referred to as D-RAM. The system 10 can be used to selectively store either high resolution images or low resolution images. For example, in the exemplary embodiment, 8 high resolution images of conventional size, for illuminating 256×256 pixels, can be stored when the system is operating in the high quality mode. Thirty-two low resolution images of a reduced size, for producing 128×128 pixels each, can be stored when the system is operating in the low quality mode. As will be shown, when the system 10 is operating in the low quality mode, it can provide a display of four low resolution images that are stored in the memory. When the system 10 is operating in the high quality mode, it can provide a display of an electronically enlarged high resolution image.

The controller 38 derives from the synchronizing signal complementary horizontal sync pulse XHSYNC and complementary vertical sync pulse XVSYNC for the character generator 44. The letter "X" preceding the terms HSYNC and VSYNC indicates that the signal is the complement of those signals. Such convention is used throughout this application. In addition, the controller 38 provides an enable signal A/D EN and a clock signal A/D CK for the analog to digital converter 32 for setting the sampling rate of the analog to digital converter at 10 Mhz. The controller 38 provides a clock signal D/A CK, complementary synchronizing signal XSYNC, and a complementary blanking signal XBLANK for the digital to analog converter 30.

The CPU 36 controls the operation of the controller 38 and interfaces the controller 38 with the control panel switches 21–27. The controller includes storage means. In addition, the CPU controls the character display generator 44 to provide the date and page number or position setting data. The CPU 36 provides a four bit word for instructing the character display generator 44 to generate characters representing the time and date data entered by the time switches and for inserting such information into the analog video image data prior to its being digitized.

The CPU 36 sends a ten bit control word to the controller 38 instructing the controller 38 to store video image data in the memory 16 when the save switch is operated, or to send the video data to the digital to analog converter 30 for display on the video monitor 18 when the display switch is operated.

Figure 4:
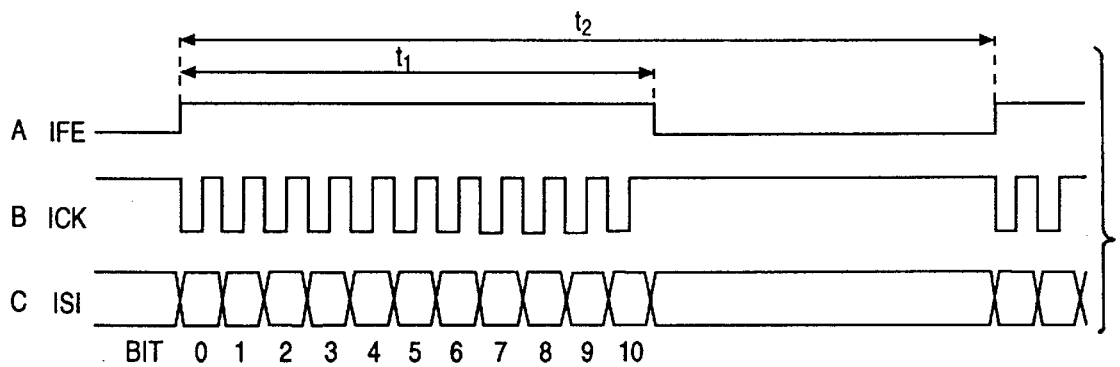
FIG. 4 is a timing diagram illustrating the relationship between signals for the central processing unit and the controller of the signal processing circuit of FIG. 2.

FIG. 4 is a timing diagram showing the timing sequence for sending data from the CPU to the controller. The 10 bit control word is shown in FIG. 4, at line C. Bits 0–4 of the control word are 5 bits of data for page identification, with bit 1 being the least significant bit and bit 4 being the most significant bit.

The controller uses the "5-bit page id data" to control the character generator by a page number character generator with a maximum of $2^5$ or 32 pictures.

Bit 5 of the control word, Save_Flg, indicates that the save switch is operated. Bit 6 of the control word, Disp_Flg, indicates that the display switch is operated. Bit 7 of the control word, Memory_Full_Flg, indicates that the memory 16 is full. Bit 8 of the control word, Memory_Empty_Flg, indicates that the memory 16 is empty. Bit 9 of the control word, HQ/XLQ_Flg, indicates the status of the enhanced mode select switch and bit 10 of the control word, Doorman_Flg, indicates that power is being applied.

The bit times are defined by serial data clock pulses 1CK at a 1 Hz rate, as shown in FIG. 4, at line B. The data is transmitted to the controller 38 during a time interval $t_1$ established by an enabling signal ISE, in FIG. 4, at line A. The duration $t_2$ of the enable signal is selected as a function of the architecture of the controller 38 and of the CPU 36.

In addition, the CPU provides a 13 bit control word for the digital-to-analog converter. The word includes 8 bits of data, a complemented read enable signal XRD, a complemented write enable signal XWR and a three-bit refresh signal RS. The refresh signal causes refreshing or updating of the Table data being stored by the RAM portion of the digital to analog converter. The Table stored in RAM DAC. The values in the Table are changed during enhancement such that different brightness and gain are achieved.

The digital to analog converter 30 is an eight bit, digital to analog converter that includes a random-access memory which functions as a table look-up. This type of digital to analog converter 30 is commonly referred to as a RAM-DAC. The RAM-DAC 30 converts the digital video image signals provided by the analog to digital converter or the digital video image signals read out of the memory 16, to analog signals for application to the video monitor. The table look up function of the RAM-DAC 30 enables the digital signal processor 29 to controls the enhancement effect of the RAM digital to analog converter 30. The RAM-DAC 30 accepts instruction from the CPU 36 to change the internal RAM TABLE values for improving the image quality by compensating for low level back light. The RAM-DAC 30 has an eight bit resolution so that signal enhancement is limited to 255 gray scale.

The LED display unit 19 includes a plurality of light emitting diode indicators that are mounted on the control panel. The indicators include a power-on indicator 47, a first memory status indicator 48, a second memory status indicator 49, and a mode select indicator 50. The power-on indicator 47 indicates that power is being applied to the circuits. The first memory status indicator 48 indicates when the memory 16 is storing data. The second memory status indicator 49 which indicates when the memory 16 is full. The mode select indicator 50 indicates whether the signal processing circuit 14 is operating in the high quality mode or the low quality mode.

The status indicators are enabled by the controller which includes a data latch for storing bits indicative of on/off condition for each of the light emitting diode indicators.

Figure 3:
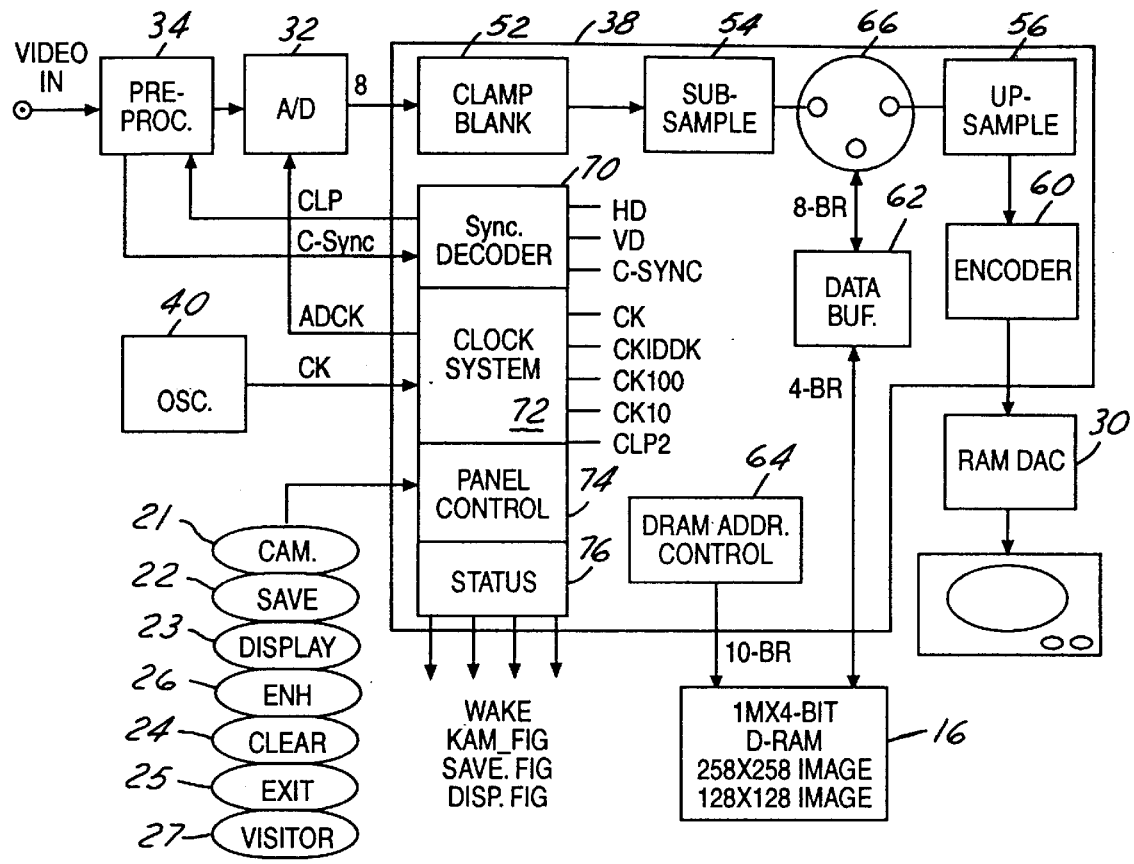
FIG. 3 is a block diagram of the controller of the signal processing circuit of FIG. 2.

Referring to FIG. 3, the controller 38 includes a clamp blank circuit 52, a sub-sampler circuit 54, an up-sampler circuit 56, a digital gain or enhance circuit 58 and an encoder 60. The controller includes a data buffer 62 and a memory controller 64. The controller 38 further includes a sync decoder 70, a clock system 72, a panel control 74, and a status circuit 76.

The digitized video image signals from the analog to digital converter 32 are applied to the clamp blank circuit 52. The clamp and blank circuit 52 clamps the clamps to zero the black level of the digitized video image signal and blanks in the non-effect period. The clamping operation ensures that the black level is clamped to 0. The sampled signals for each line occupy the whole 256 steps for the sampled signal. The clamping level changes for every scanning line. The video image signals from the clamp circuit 52 are applied to the sub-sampler 54.

The sub-sampler 54 samples the 10 Mhz data at a lower rate than the sampling rate of the analog to digital rate. In the exemplary example, the sampling rate is ½ that of the analog to digital converter so that the data is sampled to a 5 Mhz or to a 2.5 MHz data sequence as a function of the setting of the enhanced mode select switch 26.

When operating in the high quality mode, the subsampler produces 256 bytes for each of the 256 lines. When operating in the low quality mode, takes only half the signal samples produced by the analog to digital converter and so that it produces 128 bytes for each of the 128 lines.

The output of the sub-sampler 54 is connectable to the data buffer 62 for application to the memory 16 or to the up-sampler through a signal path selection device 66 represented by a three pole switch in FIG. 3. When the save flag SAVE_Flg is set, the path selection device 66 directs video image data to the data buffer 62 for storage in the memory 16. When the display flag DISP_Flg is set, the path selection device 66 directs video image data to the up-sampler to effect digital to analog conversion of the video image data to permit display of the video image on the video monitor. When camera switch 21 is operated, the path selection device 66 directs the video image data to the up-sampler 56 for processing of the video data for display.

The data buffer 52 converts the eight bit video data from the analog to digital converter 32 into 2×four bit data format for storage in the memory 16. As has been indicated, the memory 16 is a 1 MEG×4 bit D-RAM configured to store data in 4 bit words.

The memory address controller 64 generates control signals for the memory 16. The memory address controller 64 controls a 4 bit data bus D1–D4 and a 14 bit address/memory control bus for the memory 16. The memory address controller 64 provides ten address select outputs A0–A9, a complementary row address strobe signal XRAS, a complementary column address output enable signal XOE, and a complementary write enable signal XW.

The memory address controller 64 includes an address generator which provides address signals for writing digital image data on the 4 bit data bus D1–D4 into the memory 16 and for reading digital image data out of the memory 16 and returning the data to the data buffer 62 on the 4 bit data bus D1–D4. The operation of the memory address controller 64 is synchronized with the operation of the analog to digital converter by the synchronous signal generated by the sync decoder 70. When the system is operating in the low power mode, only the column address select before row address select refresh function is in operation.

The sync decoder 70 decodes the composite sync C-SYNC into a horizontal component HD and a vertical component VD for use by the clock system 72 and for the RAM A/D 32. The sync decoder 70 also generates clamping signals CLP1 for analog clamping of the pre processing circuits 34 and clamping signals CLP2 for digital clamping by the digital circuits CLP2 is reserved for other applications.

The clock system generates timing signals for sequencing the operations of the controller. The clock system generates a system clock signal at 10 MHz for the analog to digital converter 32, the digital to analog converter 30, read/write commands for the memory 16 and a refresh clock signal for refreshing the D-RAM memory. The timing signals include the 10 MHz system clock, and sub-cycle timing signals CK100K at 100 KHz, CK100 at 100 Hz, CK10 at 10 Hz and 1CK at 1 Hz. The low frequency clock signals are used by the timer in the CPU.

The panel control incudes data latch circuits that accept preset parameters received from the CPU 36 including status for the power-on switch, the display switch, the clear switch, the high quality/low quality mode select switch, and time and date parameters.

The status circuit 76 of the controller 38 includes a plurality of data latches that store status outputs, or flags, which are read by the CPU 36 on a periodic basis. The status outputs include a WAKE flag, a RAM flag, a SAVE flag and a DISPLAY flag. The WAKE flag indicates that the system is operating in the active or power up mode. The RAM flag indicates that the memory 16 is storing data and needs refreshing. The SAVE flag indicates that the save switch is operated and that data should be stored in the memory. The Display flag indicates that the display switch is operated and that video image data should be transferred to the digital to analog converter 30 for conversion to analog video signals and application to the video monitor 18 for display.

The up-sampler 56 samples the 5 Mhz/2 Mhz data to a 10 Mhz data sequence. The output of the up-sampler is connected through encoder 58 to the digital-to-analog converter 30. The encoder 58 merges the composite synchronizing signal with the video image signals to the whole 256 gray steps to meet the TV signal standard. Because this system uses the composite synchronizing signal directly extracted from the video signals produced by the camera, the system can operate in EIA or CCIR modes.

The enhance circuit is a digital gain circuit that has its gain setting changed by operation of the enhance switch. Increases the digital gain function for compensating for over contrast of the video image represented by the video data being processed.

Because the same composite sync signal is used for the output signal and the input signal, the system can be installed and/or used in NSTC or PAL, thereby increasing its flexibility and enhancing capability for use in many applications and situations.

The system 10 receives power from two separate D.C. power sources which provide D.C. voltages V1 and V2, respectively. Voltage V1 is applied to the synchronizing signal separator, to the character generator, the address generator, the digital to analog converter 30 and the sync generator. Voltage V2 is applied to the CPU 36, the memory 16, the controller 38, and the LED status display 19. The signal processing circuit 14 operates in power saving mode, temporarily disconnecting voltage source V1 from the synchronizing signal separator, the character generator, the address generator, the digital to analog converter 30 and the sync generator when no data is being displayed. Thus, if there are no inputs via the switches 21–27, the controller 38 turns off power to non-essential circuits of the system 10.

Referring to FIGS. 1–3, the operation of the video image processing and storage system will now be described. Assuming initially that the camera switch 21 is operated, so that causes the view outside, or within the field of the camera, scene is displayed.

The analog video image signals produced by the video camera 12 are converted to digital signals by the analog to digital conversion circuit 14 of the signal processing circuit 14 and are processed by the digital signal processor for display and/or for storage in the memory 16.

The synchronizing signal separator 46 separates the composite synchronizing signal from the video image signal and applies the composite synchronizing signal to the sync decoder of the controller 38 to enable the controller to generate the horizontal sync signal signals H/D and the vertical sync signal signals H/D and V/D for the display of the video image data on the video monitor.

When the system is operating in the camera mode, the video image signals generated by the video camera are passed directly to the video monitor for display without storage. If for any reason a person viewing a picture on the video monitor wants to save the picture that is being displayed, this is done by operating the save switch 22. When the save switch is operated, this causes a memory write cycle to be initiated for storing in the memory 16 the video image that is currently being generated by the video camera.

To add time and date information to the video image being viewed in the camera mode, by entering the appropriate information via the switches, the CPU provides an instruction to the character generator to accept data to generate the appropriate characters and intersperse the character data with the video image data signals to cause the time and date information to be displayed superimposed on the video image on the screen of the video monitor. This function also can be used to display the page number.

Assuming now that a visitor at the entrance depresses the visitor switch 27. When the visitor switch is operated, the process of storing and displaying a video image of the visitor is initiated. The first operation of the visitor switch 27 triggers image capture, causing storage of first image in the memory 16. Any further operations of the switch are ignored for a period of at least about 100 seconds. When the system is operating in the visit mode, the first video image signal that is produced by the video camera is stored in the memory 16. In addition, this video image signal is supplied to the digital analog signal conversion circuit for conversion to analog signals for controlling the video monitor for producing a display of the image represented by the video image signals.

When the system is operating in the visit mode, the first video image signal that is produced by the video camera is stored in the memory 16. In addition, this video image signal is supplied to the digital analog signal conversion circuit for conversion to analog signals for controlling the video monitor for producing a display of the image represented by the video image signals.

To view all of the images that are stored in the memory, the resident has the display switch 23 is a pulse switch the operation of which causes sequential display of all of the video images represented by video image data that is stored in the memory 16.

To clear all of the video image data stored in the memory 16 from the memory, the resident depresses the clear switch 24 and maintains the switch depressed for more than three seconds. The exit switch 25 causes the system 10 to be transferred to a power-down or sleep mode.

If the enhanced mode select switch 26 is operated, the gain of the enhance circuit is increased, causing the low light intensity value of the displayed real time images or displayed memory images to be increased. The enhanced mode select switch 26 effectively selects the quality of the picture to be displayed.

While the invention has been described with reference to preferred embodiments, various modifications can be made without departing from the spirit and scope of the invention as defined in the appended claims.

We claim:

1. A video surveillance system for monitoring and recording images within a surveillance area, comprising:

a video camera for viewing images in said area and for providing analog video image signals:

input means including analog to digital converting means for converting said analog video image signals into digital video image signals;

memory storage means;

a video monitor for displaying video images;

signal processing means for processing said digital video image signals for normally causing said images to be successively displayed in real time on said video monitor, and for selectively storing certain of said digital video image signals in said memory means;

read out means for causing said processing means to read said digital video image signals out of said memory means;

output means including digital to analog signal converting means for converting said digital video image signals read out of said memory means into analog video image signals for application to said video monitor; and first switch means actuated by an event within said surveillance area and operative to trigger said processing means to store in said memory means certain digital video image signals representing at least a first video image.

2. The system according to claim 1, wherein said processing means is responsive to said first switch means for storing digital video image signals representing second, third and fourth video images, and said system further includes second switch means operative to trigger said read out means to sequentially read out from said memory means video images signals corresponding to said first, second, third and fourth images.

3. The system according to claim 1, wherein said memory means is a dynamic random access memory, and wherein said signal processing means includes means for periodically refreshing said memory.

4. The system according to claim 1, wherein said processing means includes means for preventing the storage in said memory means of digital video image signals representing a second image for a predetermined length of time following an actuation of said first switch means.

5. The system according to claim 1, including means for causing said signal processing means to display on said video monitor an enlarged portion of said first video image.

6. A video surveillance system for monitoring and recording images within a surveillance area, comprising:

a video camera for viewing images in said area and for providing analog video image signals:

analog to digital converting means for sampling said analog signals at a first rate for converting said analog video image signals into digital video image signals; memory storage means;

a video monitor for displaying video images;

signal processing means for processing said digital video image signals, for normally causing said images to be successively displayed in real time on said video monitor, said signal processing means including sampling means for sampling said sampled signals provided by said analog to digital converting means at a second rate which is different than said first rate, and said signal processing means including means for selectively storing certain of said digital video image signals in said memory means;

means for causing said digital video image signals to be read out of said memory means;

digital to analog signal converting means for converting said digital video image signals read out of said memory means into analog video image signals for application to said video monitor and switch means actuated by an event within said surveillance area and operative to trigger said processing means to store in said memory means certain digital video image signals representing at least a first video image.

7. A video surveillance method for monitoring and recording images within a surveillance area using a video camera, said method comprising the steps of:

viewing said area with said camera to produce analog video image signals representing real time images of said area;

converting said analog video image signals into digital video image signals;

applying said analog signals to a video monitor for providing a real time video display of said images;

triggering a switch based on the occurrence of an event in said area; storing digital video image signals in a memory when said switch is triggered to thereby capture an image of said area at the time said switch is triggered;

reading said digital video image signals out of said memory; converting said digital video image signals to analog signals; and applying said converted analog signals to said video display to thereby display the image of said area occurring at the time of said event.

8. The method according to claim 7, including storing in said memory digital video image data for at least first, second, third and fourth video images and reading out said video image data for said first, second, third and fourth video images to simultaneously display said first, second, third and fourth video images on said video display.

9. The method according to claim 8 including causing display of an enlarged portion of said first video image on said video display.

* * * * *